United States Patent

[11] 3,551,664

[72] Inventor George W. Mebus
Feasterville, Pa.
[21] Appl. No. 692,899
[22] Filed Dec. 22, 1967
[45] Patented Dec. 29, 1970
[73] Assignee the United States of America, as represented by the Secretary of the Navy

[54] BEARING ANGLE COMPUTER
10 Claims, 5 Drawing Figs.

[52] U.S. Cl. .......... 235/164, 235/156
[51] Int. Cl. .......... G06f 7/38, G06f 7/52, G06f 7/56
[50] Field of Search .......... 235/156, 164, 155, 152

[56] References Cited

UNITED STATES PATENTS

| | | | |
|---|---|---|---|
| 3,172,097 | 3/1965 | Imlay | 235/155X |
| 3,182,180 | 5/1965 | Keir | 235/164 |
| 3,223,831 | 12/1965 | Holleran | 235/164 |
| 3,229,079 | 1/1966 | Zink | 235/164 |
| 3,319,057 | 5/1967 | Githens | 235/164 |
| 3,378,677 | 4/1968 | Waldecker et al. | 235/164 |

*Primary Examiner*—Malcolm A. Morrison
*Assistant Examiner*—James F. Gottman
*Attorneys*—G. J. Rubens, Henry Hansen and B. Frederick Buchan, Jr.

ABSTRACT: A special purpose digital computer which includes a special digital divider and which is adapted for computing and providing or displaying a bearing angle from a pair of orthogonal component binary signals. The computer includes a right-shifting divisor register whose last stage is connected to receive as an input signal the greater of the component signals and also to receive through gating the output signal of the first stage thereof. The parallel output signals of the divisor register and of a dividend register whose last stage is connected to receive the lesser component signal are fed to a ring subtracter whose difference signals may be fed to the registers and some of whose borrow signals including the most significant are fed to a logic unit which provides input signals to a left-shifting quotient register. Control circuitry enables the division of the lesser component signal by the greater to obtain the tangent of an angle related to the bearing angle, which tangent is corrected by a logic controlled series of subtractions to provide the bearing angle in binary form. The same registers are additionally used in a process involving divisions to convert the binary bearing angle signal to three binary coded decimals for driving a display.

INVENTOR.
GEORGE W. MEBUS

BY

ATTORNEYS

INVENTOR.
GEORGE W. MEBUS
BY
ATTORNEYS

INVENTOR
GEORGE W. MEBUS
BY
ATTORNEYS

INVENTOR.
GEORGE W. MEBUS
BY
ATTORNEYS

BEARING ANGLE COMPUTER

STATEMENT OF GOVERNMENT INTEREST

The invention described herein may be manufactured and used by or for the Government of the United States of America for governmental purposes without the payment of any royalties thereon or therefor.

BACKGROUND OF INVENTION

It is desirable that digital bearing angle computers be relatively inexpensive and have as small a size as possible. Apparatus is known which is adapted for sensing a radio or sonar signal emanating from a remote point and providing a pair of component signals indicative of the intensities of orthogonal, geographically oriented, components of the signal in a serial binary form wherein the least significant digit of an intensity portion of the component signals is provided first and a direction indicating sign digit is provided last. The processing of such component signals to obtain a bearing angle of the radio or sonar signal source with known apparatus conventionally requires apparatus for inverting the order of the signal so that the most significant digit in the intensity portion of the component signals is provided first. This requires the inclusion of several registers and complicated logic units. Additionally, some known apparatus for dividing binary signals includes several registers having more stages than the number required for buffering purposes and for storing the bits of information in the signals to be processed. The elimination of excess stages necessitates the design and inclusion of complex logic units which can increase both the size and the cost of the apparatus. Further, known apparatus for converting binary numbers to decimals requires the use either of complex logic or of relatively sizeable configurations of up-and-down counters.

SUMMARY OF INVENTION

A general purpose of this invention is to provide a bearing angle computer of reduced size and complexity which includes a unique digital divider and which is capable of processing orthogonal component signals which are provided in serial binary form with the least significant digit being provided first. Briefly, this may be accomplished by providing a computer including right-shifting divisor and dividend registers, a unique ring subtracter which subtracts the contents of the divisor register from the contents of the dividend register, by providing circuitry to selectively enter the digit shifted out of the first stage of the divisor register back into the last stage of that register, by providing means which, in effect, cause a shifting of the highest order stage of the subtracter to the right, by providing a left-shifting quotient register responsive to borrow signals generated in the subtracter, and by providing control and gating circuitry for developing the quotient of the dividend and the devisor in the quotient register. The invention further contemplates including control circuitry for enabling the bearing angle to be computed by a series of subtractions from a binary signal representing the quotient of the component signals for enabling the conversion of the binary signal by a process involving two divisions into three binary coded decimals for driving a display.

DESCRIPTION OF PREFERRED EMBODIMENT

Figure 1:
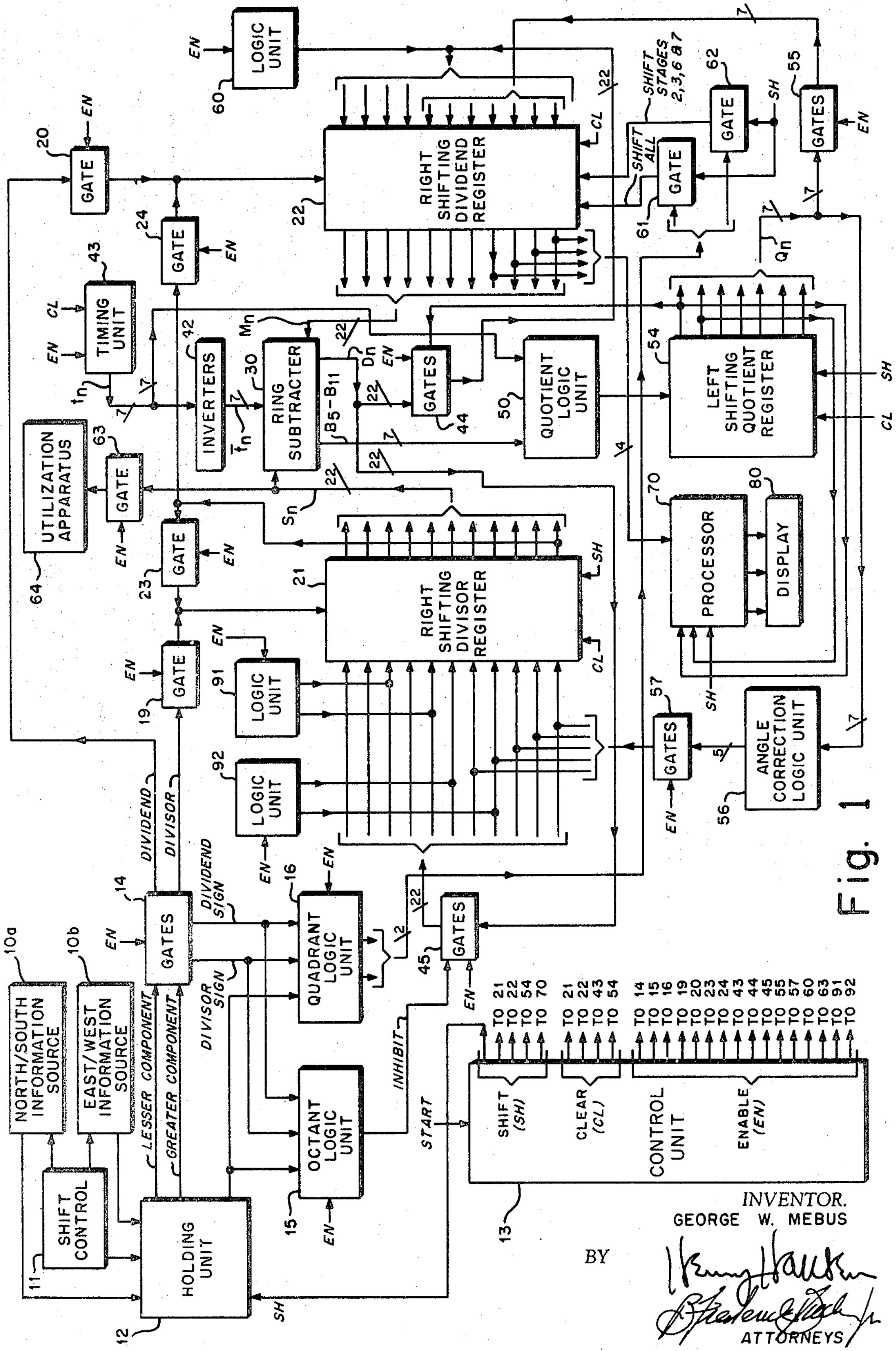
FIG. 1 represents a block diagram of a bearing angle computer according to the invention.

The computer of FIG. 1 is specifically adapted for converting a pair of component signals from apparatus responsive to directional signal sensors, such as a pair of directional hydrophones oriented respectively in north-south and east-west directions, into a binary signal indicative of a bearing angle geographically referenced to north and for further processing the bearing angle signal to visually display the bearing angle in decimal form. More particularly, it is contemplated that the computer be provided with a pair of binary signals each indicative of both the intensity and the direction of a respective signal from sensors such as north-south and east-west directional hydrophones (not shown) by appropriate signal sources 10*a* and 10*b* which may include analog-to-digital converters (not shown). The binary signals from the sources 10*a* and 10*b* are conveniently provided in a serial form having a plurality of bits of information such as eleven bits wherein the least significant bit of intensity information is provided first and the bit of direction or sign information is provided last. The component signals are shifted into holding unit 12 as they may become available under the direction of a shift control unit 11 which may also be adapted to provide a computer-start signal.

More particularly, the holding unit 12 includes a pair of right-shifting shift registers (not shown) which store the information provided by the sources 10*a* and 10*b*. The unit 12 also includes a comparer such as a flip-flop and logic circuitry (not shown) for both ascertaining as the component signals are shifted in and providing an indication as to which of the component signals has the greater intensity portion. Upon receiving a series of shift signals supplied a control unit 13 in response to a start signal, the holding unit 12 shifts out the binary component signal having the greater intensity portion through a divisor output line and shifts out the component signal having the lesser intensity portion through a dividend output line, the divisor and dividend output lines being connected to gates 14. The control unit 13 provides a series of combinations of shift, clear and enable signals (abbreviated SH, CL and EN in the drawing) to various portions of the computer as is hereinafter shown. The holding unit 12 permits the fabrication of a computer of less complexity in that it assures that the dividend will always be less than or equal to the divisor and that the computer need only initially to compute, as is hereinafter shown, a quotient which is always equal to or less than one and which represents an angle A related to the bearing angle to be computed from the component signals. Since the relative intensities and the directions or signs of the component signals are known, the initial quotient may be processed to provide the angle which is referenced to north.

The gates 14 normally pass the divisor and dividend to their output terminals, but they are responsive to an enable signal from the control unit 13 for causing the last or eleventh bit of information in each component signal which indicates the signs of the divisor and the dividend signals to be diverted from the normal output terminals and to be provided instead to an octant logic unit 15 and to a quadrant logic unit 16, hereinafter more fully explained. The gates 14 may include, for example, a pair of AND gates connected for receiving a respective one of the divisor and dividend signals and each of the pairs connected also for receiving the enable signal and the complement thereof from the control unit 13.

The 10-bit signals indicative of the intensities of the divisor and dividend signals are applied through respective gates 19 and 20 which have been enabled by enable signals from the control unit 13 to the last stages of right-shifting divisor and dividend registers 21 and 22. The signals are progressively shifted into the registers 21 and 22 so that after 11 shifts the least significant digits or bits of information of the divisor and dividend signals are located in the first stages, i.e., stage 1, of the registers 21 and 22. Each of the registers 21 and 22 includes a buffer stage, conveniently stage 11, and hence is provided with N+1 stages where "N" is the number of bits of information to be shifted thereinto. The output $S_1$ signal of stage 1 of the divisor register 21 is applied through a gate 23 when it has been enabled by the control unit 13 to the last stage, i.e., stage 11, of register 21 and is applied through a gate 24 when it has been enabled by the control unit 13 to stage 11 of the register 22. The registers 21 and 22 each may conveniently be made from 11 cascaded, gated input, set-reset flip-flops which respectively provide for each complimentary output signals $S_n$ and $\overline{S}_n$ or $M_n$ and $\overline{M}_n$. The registers 21 and 22 may be cleared and may be shifted by appropriate clear and shift signals provided along with enable signals by the control unit 13 in a programmed sequence.

Figure 2:
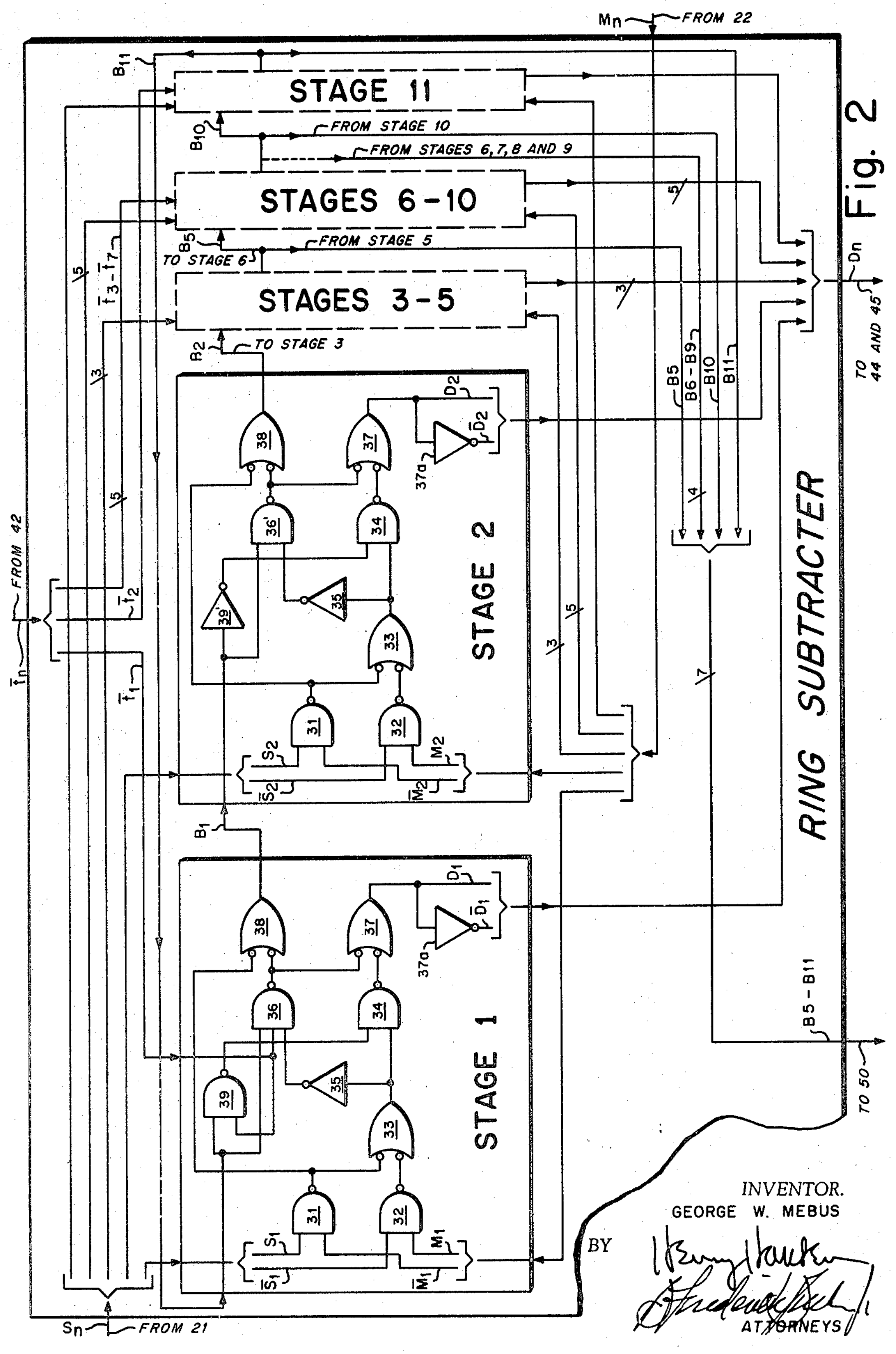
FIG. 2 represents a block diagram of a ring subtracter included in the computer of FIG. 1.

The complementary output signals of each of the stages of both the registers 21 and 22 are applied to the correspondingly numbered stages of a ring subtracter 30 which is more particularly shown in FIG. 2. Generally, the ring subtracter 30 in accordance with borrow logic and difference logic in each stage thereof subtracts the contents of register 21, i.e., a subtrahend, from the contents of register 22, i.e., a minuend, and provides from each stage 11 a binary difference signal $D_n$. Additionally, borrow signals $B_n$ generated by the more significant stages such as five through eleven are provided as a second parallel output signal of the subtracter 30 for a purpose hereinafter explained.

Referring now to FIG. 2 wherein the ring subtracter 30 is shown in greater detail, stage 1 thereof includes a pair of inverted output AND gates 31 and 32 whose output signals are fed to an inverted input OR gate 33. Gate 31 is connected to receive the output signal $S_1$ of stage 1 of the register 21 and the complementary output signal $\overline{M}_1$ from stage 1 of the register 22, while gate 32 is connected to receive the complementary output signal $\overline{S}_1$ of stage 1 of the register 21 and the output signal $M_1$ from stage 1 of the register 22. The output signal of the OR gate 33 is fed to an inverted output AND gate 34 and is also fed through an inverter 35 to an inverted output AND gate 36. The outputs of the AND gates 34 and 36 are fed to the inverted input OR gate 37 whose output signal comprises the difference signal $D_1$ for stage 1. An inverter 37a is connected to the gate 37 to provide the complementary difference signal $\overline{D}_1$. The output signals of the AND gates 31 and 36 are also fed to an inverted input OR gate 38 whose output signal comprises the borrow signal $B_1$ of stage 1 which is fed to stage 2. The borrow signal $B_11$ from stage 11 is applied to the AND gate 36 and is applied to an inverted output AND gate 39 whose output signal, in turn, is fed to the AND gate 36.

The AND gates 36 and 39 are also connected to receive a borrow blocking complementary output signal $\overline{t}_1$ from a parallel group of inverters 42 which are connected to complement the parallel timing output signals $t_1$ through $t_7$ of a timing unit 43. The unit 43 responds like a shift register to successive enable signals from the control unit 13 to cause successive ones, in turn, of its output signals $t_1$ —$t_7$ to be a ONE and the others to be ZERO. The unit 43 is reset by a clear signal from the control unit 13 to provide output signals which are all ZERO. For example, the signals $t_1$ and $\overline{t}_1$ become respectively a ONE and a ZERO the first time the unit 43 is enabled after clearing, and they return to their normal state of ZERO and ONE, respectively, after the second enable signal.

Stages 6 through 11 of the subtracter 30 are identical to stage 1 except that the stages 11, 10, 9, 8, 7, and 6 receive respective ones of the borrow blocking signals $\overline{t}_2$, $\overline{t}_3$, $\overline{t}_4$, $\overline{t}_5$, $\overline{t}_6$ and $\overline{t}_7$ from the inverters 42. On the other hand, stages 2 through 5, inclusive, are not connected to receive respective borrow blocking signals from the inverters 42. Consequently, in those stages, the triple input AND gate 36 has been replaced by a double input, inverted output AND gate 36 connected to receive the borrow signal $B_{n-1}$ from the preceding stage and connected to receive the output signal from the inverter 35, and the AND gate 39 has been replaced by an inverter 39.

From the above description, it is apparent that stages 2—5, inclusive, of the subtracter 30 have been implemented to provide the signals B and D generally in accordance with the following equations:

$$B=B_n\overline{S}\overline{M}+B_nSM+S\overline{M}$$

$$D=B_n\overline{S}\overline{M}+B_nSM+\overline{B}_nS\overline{M}+\overline{B}_n\overline{S}M$$

Subtracter 1 and 6—11, inclusive, have been similarly designed to operate in accordance with the following equations:

$$B=B_n\overline{t}\overline{S}\overline{M}+B_n\overline{t}SM+S\overline{M}$$

$$D=B_n\overline{t}\overline{S}M+\overline{B}_n\overline{t}SM+\overline{B}_nS\overline{M}+\overline{B}\overline{S}M+tS\overline{M}+t\overline{S}M$$

It is apparent from the above equations that each of the stages of the subtracter 30 will provide a respective borrow output signal B which is a ONE when the output signals S and M from the correspondingly numbered stages of registers 21 and 22 are, respectively, a ONE and a ZERO. Additionally, each stage will also provide a borrow signal B which is a ONE if the output signals S and M of the registers 21 and 22 are both the same and the borrow signal from the preceding stage is a ONE and, in the case of stages 1 and 6—11, inclusive, only if, in addition, the complementary timing signal is a ONE. It is also apparent if the output signals S and M from the correspondingly numbered stages of the registers 21 and 22 are the same and if the borrow signal from the preceding stage is a ONE and, in the case of the stages 1 and 6—11, inclusive, additionally if the complementary timing signal $\overline{t}$ received thereby is a ONE, that the difference signal D of that stage will be a ONE. Additionally, the difference signal D of any stage will be a ONE where the output signals S and M of the correspondingly numbered stages of the registers 21 and 22 are not the same and the borrow signal B from the preceding stage is a ZERO. Additionally, in the case of stages 1 and 6—11, inclusive, if the output signals S and M from the registers 21 and 22 are not the same and the complementary timing signal $\overline{t}$ received by that stage is a ZERO, the stage will produce a difference signal which is a ONE irrespective of whether the borrow signal from the preceding stage is a ONE or a ZERO. Therefore, during the operation of the subtracter 30, since one of the complementary timing signals $\overline{t}$ will be a ZERO, a borrow signal of ONE can not be continually propagated through the stages of the subtracter 30 for the borrow and difference signals of the particular stage which is receiving the only ZERO timing signal $\overline{t}$ will be the same as though that stage were receiving a ZERO borrow signal. The ZERO complementary timing signal $\overline{t}$ is used, in effect, to block the borrow signal applied to the lowest order stage. Therefore, progressive shifting of the ZERO signal $\overline{t}$ to the stage on the right can be said to effect a progressive shifting to the right of the most significant stage of the subtracter 30.

The difference signals $D_1$ through $D_11$ of all the stages are fed from the ring subtracter 30 through gates 44 when enabled to the inputs of the corresponding stages of the register 22 and through gates 45 when enabled by an enable signal from the control unit 13 to the inputs of the corresponding stages of the registers 21. The borrow signals B from each of the stages 5—11, inclusive, are fed to a quotient logic unit 50 which is connected to receive the parallel timing signals $t_1$ through $t_7$ from the timing unit 43.

Figure 3:
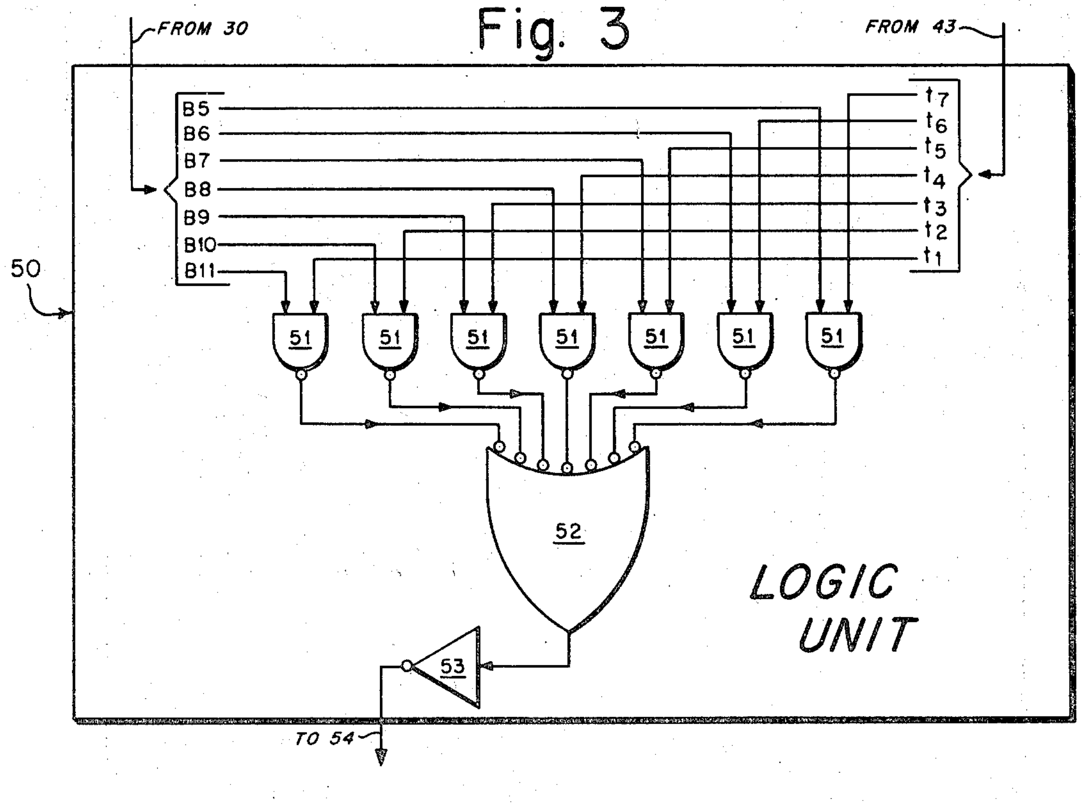
FIG. 3 represents a block diagram of a logic unit included in the computer of FIG. 1.

Referring now to FIG. 3, the logic unit 50 includes seven inverted output AND gates 51 whose output signals are fed to an inverted input OR gate 52 whose output signal, in turn, is fed through an inverter 53 to the input of the lowest order stage of a left-shifting quotient register 54. Each of the AND gates 51 is connected to receive a respective one of the pairs of borrow and timing signals $B_11$ and $t_1$, $B_10$ and $t_2$, $B_9$ and $t_3$, $B_8$ and $t_4$, $B_7$ and $t_5$, $B_6$ and $t_6$, and $B_5$ and $t_7$. During the division process, the logic unit 50 receives a plurality of timing signals only one of which is a ONE after any given enablement of the unit 43 by the unit 13. Therefore, the logic unit 50 will provide a ZERO to the register 54 if, and only if, the particular AND gate 51 which is receiving the ONE timing signal 7 is also receiving a ONE borrow signal B from the subtracter 30.

The left shifting quotient register 54 has seven stages and is responsive to clear and shift signals provided by the control unit 13. The number of stages was chosen in accordance with the desired accuracy for the bearing computer and is the same as the number of timing signals $t$ produced by the unit 43. the output of the lowest order stage of the register 54 is fed back to enable the gate 44. Consequently, if the quotient logic unit 50 provides the register 54 with a ONE, shifting the register 54 will cause a ONE to be applied to the gates 44 which, if it is also receiving an enable signal from the control unit 13, will apply the complementary difference signals $D_n$ of the ring subtracter 30 to the inputs of the correspondingly numbered stages of the register 22. However, if the unit 50 applies a ZERO to the register 54, the gates 44 will not be enabled and the contents of the register 22 will not be changed.

Figure 4:
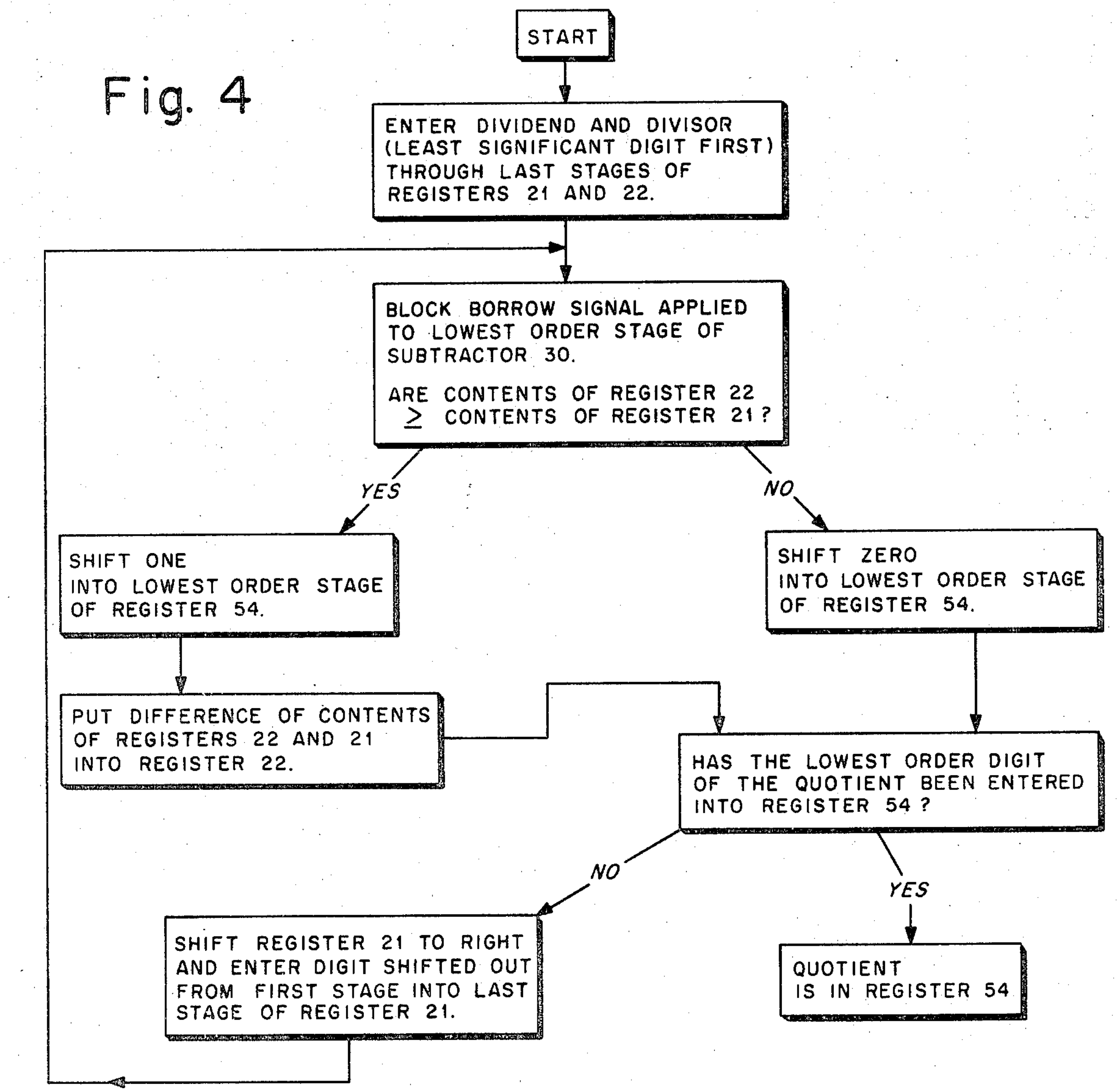
FIG. 4 represents a flow chart illustrating the divisional process of the computer of FIG. 1.

The registers 21, 22 and 54, the gate 23, the subtracter 30, the gates 44 and the timing and logic units 43 and 50 can be controlled by the control unit 13 generally in accordance with the flow diagram of FIG. 4 to provide a binary number in the register 54 which is the quotient of the number in the register 22 divided by the number in the register 21. The signals $S_n$ and $M_n$ of the registers 21 and 22 are applied to the subtracter 30. When the timing unit 43 is first enabled, the borrow signal $B_11$ which would be applied to subtracter stage one would be blocked, establishing subtracter stage 11 as the highest order subtracter stage. After a short ripple time, the quotient register 54 is shifted to the left to enter into its lowest order stage a signal which is, in effect, the complement of the borrow signal from the highest order subtracter stage. Only if the contents of the register 22 are equal to or greater than the contents of register 21 so that a ONE is entered into the quotient register 54 will the gates 44 be enabled to cause the contents of the dividend register 22 to be replaced by the subtracter difference signal $D_n$, i.e., the positive remainder. If a ZERO is entered into the register 54, the contents of the register 22 remain the same. Thereafter, the contents of the register 21 are shifted to the right, and the digit shifted out of stage one is fed through the enabled gate 23 and entered into stage 11 thereof. In effect, the highest order subtracter stage is shifted to the right by a succeeding enablement of the unit 43 because the borrow signal $B_10$ applied to the new lowest order subtracter stage, i.e., stage 11, is blocked. The quotient register 54 is shifted again to the left to enter the next digit in the quotient. Successive enablements of the unit 43, of the gates 23 and of the gates 44 and shifts of the registers 21 and 54 continue to occur until the quotient register 54 is filled. Table I is an example of the contents of the registers 21, 22 and 54 and the subtracter signals $B_n$ and $D_n$ immediately after successive shifts of register 54 wherein the dividend of 139 which was initially stored in binary form in the dividend register 22 is to be divided by 287 which was initially stored in binary form in the divisor register 21.

TABLE I

| Group | Signal | Stage 11 | 10 | 9 | 8 | 7 | 6 | 5 | 4 | 3 | 2 | 1 |
|---|---|---|---|---|---|---|---|---|---|---|---|---|
| I | $M_n$ | 0 | 0 | 0 | 1 | 0 | 0 | 0 | 1 | 0 | 1 | 1 |
| | $S_n$ | 0 | 0 | 1 | 0 | 0 | 0 | 1 | 1 | 1 | 1 | 1 |
| | $D_n$ | 0 | 1 | 1 | 0 | 1 | 1 | 0 | 1 | 1 | 0 | 0 |
| | $B_n$ | 1 | 1 | 1 | 0 | 1 | 1 | 1 | 1 | 1 | 0 | 0 |
| | $Q_n$ | — | — | — | — | 0 | 0 | 0 | 0 | 0 | 0 | 0 |
| II | $M_n$ | 0 | 0 | 0 | 1 | 0 | 0 | 0 | 1 | 0 | 1 | 1 |
| | $S_n$ | 1 | 0 | 0 | 1 | 0 | 0 | 0 | 1 | 1 | 1 | 1 |
| | $D_n$ | 1 | 0 | 1 | 1 | 1 | 1 | 1 | 1 | 0 | 1 | 1 |
| | $B_n$ | 1 | 1 | 1 | 1 | 1 | 1 | 1 | 1 | 1 | 1 | 1 |
| | $Q_n$ | — | — | — | — | 0 | 0 | 0 | 0 | 0 | 0 | 0 |
| III | $M_n$ | 0 | 0 | 0 | 1 | 0 | 0 | 0 | 1 | 0 | 1 | 1 |
| | $S_n$ | 1 | 1 | 0 | 0 | 1 | 0 | 0 | 0 | 1 | 1 | 1 |
| | $D_n$ | 0 | 1 | 0 | 0 | 1 | 0 | 0 | 0 | 0 | 1 | 1 |
| | $B_n$ | 1 | 1 | 0 | 0 | 1 | 0 | 0 | 0 | 1 | 1 | 1 |
| | $Q_n$ | — | — | — | — | 0 | 0 | 0 | 0 | 0 | 0 | 1 |
| IV | $M_n$ | 0 | 1 | 0 | 0 | 1 | 0 | 0 | 0 | 0 | 1 | 1 |
| | $S_n$ | 1 | 1 | 1 | 0 | 0 | 1 | 0 | 0 | 0 | 1 | 1 |
| | $D_n$ | 0 | 1 | 1 | 0 | 0 | 0 | 1 | 1 | 1 | 1 | 1 |
| | $B_n$ | 1 | 1 | 1 | 0 | 0 | 1 | 1 | 1 | 1 | 1 | 1 |
| | $Q_n$ | — | — | — | — | 0 | 0 | 0 | 0 | 0 | 1 | 1 |
| V | $M_n$ | 0 | 1 | 1 | 0 | 0 | 0 | 1 | 1 | 1 | 1 | 1 |
| | $S_n$ | 1 | 1 | 1 | 1 | 0 | 0 | 1 | 0 | 0 | 0 | 1 |
| | $D_n$ | 0 | 1 | 1 | 1 | 0 | 0 | 0 | 1 | 1 | 0 | 1 |
| | $B_n$ | 1 | 1 | 1 | 1 | 0 | 0 | 0 | 0 | 0 | 0 | 1 |
| | $Q_n$ | — | — | — | — | 0 | 0 | 0 | 0 | 1 | 1 | 1 |
| VI | $M_n$ | 0 | 1 | 1 | 1 | 0 | 0 | 0 | 1 | 1 | 0 | 1 |
| | $S_n$ | 1 | 1 | 1 | 1 | 1 | 0 | 0 | 1 | 0 | 0 | 0 |
| | $D_n$ | 0 | 1 | 1 | 1 | 1 | 0 | 0 | 0 | 1 | 0 | 0 |
| | $B_n$ | 1 | 1 | 1 | 1 | 1 | 0 | 0 | 0 | 0 | 0 | 0 |
| | $Q_n$ | — | — | — | — | 0 | 0 | 0 | 1 | 1 | 1 | 1 |
| VII | $M_n$ | 0 | 1 | 1 | 1 | 1 | 0 | 0 | 0 | 1 | 0 | 0 |
| | $S_n$ | 0 | 1 | 1 | 1 | 1 | 1 | 0 | 0 | 1 | 0 | 0 |
| | $D_n$ | 1 | 1 | 1 | 1 | 1 | 1 | 1 | 1 | 1 | 1 | 1 |
| | $B_n$ | 1 | 1 | 1 | 1 | 1 | 1 | 1 | 1 | 1 | 1 | 1 |
| | $Q_n$ | — | — | — | — | 0 | 0 | 1 | 1 | 1 | 1 | 0 |

Referring to table I, it is to be noted that the complements of each of the borrow signals $B_11$, $B_10$, $B_9$, $B_8$, $B_7$, $B_6$, and $B_5$, respectively of successive ones of the groups I, II, III, IV, V, VI, and VII are the same as the quotient $Q_n$ of group VII. Considering a decimal point to be located between the digits in seventh and sixth stages of the quotient register 54, the quotient $Q_n$ obtained in the above example represents the decimal 0.46875. Computation of the actual quotient 139/287 in decimal form by long division yields 0.484321, which number is less than the decimal 0.484375 which could be represented by the next greater fractional binary number 0.011111. It may further be noted, for example, that when the highest order borrow signal of a particular group is a ZERO such as $B_9$ of group III, $\bar{t}_3$ applied to stage ten being a ZERO, the signal $M_n$ of the next group, group IV, is changed to equal the signal $D_n$ of the preceding group, group III, because gate 44 was enabled upon the shift of a ONE into the lowest order stage of the quotient register 54.

In order that the quotient which is indicative of the tangent of an angle A may be placed in the dividend register 22 for further processing to compute the geographically referenced bearing angle and in order to facilitate converting the bearing angle from binary form into three binary coded decimals for driving a display, the parallel output signals $Q_n$ of the quotient register 54 are applied through gates 55 when enabled by an enable signal from the control unit 13 to the inputs of the first seven correspondingly numbered stages of the dividend register 22. Additionally, the parallel output signal $Q_n$ of the register 54 is applied to an angle correction logic unit 56 whose parallel output signal represents a correction number which is applied through gates 57 when enabled by the control unit 13 to the first five stages of the register 21.

In general, the function of the angle correction logic unit 56 is to provide a binary whole number which may be subtracted from the quotient considered as a binary whole number to yield a binary whole number which represents, to the nearest degree, a related angle A whose tangent is represented by the six bit fractional binary number appearing in the quotient register 54 to the left of a binary point.

The quotient of exactly equal divisor and dividend signals is the decimal 1.00000. It can be shown that after the above indicated division process, the quotient register 54 will contain the binary number 1.000000 since the initial highest order borrow signal $B_11$ will be a ZERO. The whole number represented by the binary series 1.000000 is the decimal 64, while the fractional binary number 1.000000 appearing in the quotient register 54 after seven shifts thereof is the decimal one. Since the angle 45° has a tangent of 1 it appears that by subtracting a binary 19 from the binary 64, a binary number representing 45 may be obtained.

In all other cases, since the divisor signal is larger than the dividend signal by reason of the action of the holding unit 12 and after the timing unit 43 has been enabled for the first time, $B_1$1 will be a ONE so that, thereafter, upon the first shift of the quotient register 54 a ZERO will be entered. While greater accuracy could be obtained by including a quotient register 54 having more stages than seven and by correspondingly increasing the number of timing signals $t_n$ provided by the unit 43, the advantage of using a 6-bit fractional binary number for representing the fractional quotient which is equal to the tangent of the angle A less than 45° becomes apparent when it is recognized that the whole numbers represented by the series of 6-binary digits in the quotient are equal to or greater than the whole numbers which correspond to the desired related angles A.

For example, when the quotient register 54 contains the binary number 0.000001 the value of the fractional number is the decimal 0.015625 which is the tangent of 0° 54′. Considering the quotient $Q_n$ as a whole number, the corresponding decimal is one. Hence, the angle correction logic unit 56 will provide a binary correction number of zero. The angle 25° 7′ has a tangent which is substantially equal to the decimal represented by the quotient 0.011110 when considered as having a 6-bit fractional portion. Considered as a whole number, the quotient has a value of 30. Consequently, the logic unit 56 would provide the correction number of 5 in binary form, and the related angle A of 25 would appear in the register 21 after subtracting the correction number from the quotient.

The angle correction logic 56 is constructed so that the quotient $Q_n$, considered as a whole number, minus the correction number provided by the unit 56 is equal to the corresponding related angle A whose tangent is substantially the same as the quotient, considered as a 6-bit fractional number. The angle A is chosen to introduce the minimum possible error. Each of the 64 possible combinations of the six least significant digits in the quotient register 54 corresponds to one of a series of fractional binary numbers whose series of decimal values represent the tangents of a series of respective angles all of which are less than 45°. The correction number which is to be produced by the logic unit 56, in general, may be ascertained by rounding off those respective angles in the series to the nearest degree to select the desired angle A is the corresponding correction number.

Enabling the gates 55, the quotient $Q_n$ appearing in the quotient register 54 may be stored in the cleared register 22. The correction number in binary form is applied to the cleared register 21 by enabling the gates 57. The subtracter 30 thereafter automatically provides the difference signal $D_n$ representing the angle A which may be stored in the register 21 by enabling the gates 45. Since the correction number applied to register 21 is always less than the quotient $Q_n$ stored in the register 22, no possibility exists that a borrow signal will be continually propagated through the stages of the subtracter 30.

After computing the quotient of the divisor and dividend signals placed in the respective registers 21 and 22 by the holding unit 12 and after subtracting from that quotient the correction number selected by the logic unit 56, the register 21 will contain a binary number indicative of the angle A which has a value between 0 and 45°. In order to obtain therefrom the geographically referenced bearing angle, the relationship of the angle A to the cardinal direction, north which is represented by both 0° and 360°, must be ascertained. Since indications both of the signs of the north-south and the east-west component signals and of whether the north-south component signal has the greater intensity are available, the value of the bearing angle may be ascertained by subtracting the number A or the number 90 − A from the number representing the largest angle in the respective particular quadrant wherein the bearing angle lies, i.e., 90, 180, 270 or 360. The number A or the number 90 − A depends upon whether the bearing angle lies in an odd or an even octant as is shown in table II below.

TABLE II

| | Logic 15 effects entry into 21 of— | Bearing angle quadrant | Logic 16 effects entry into 22 of— |
|---|---|---|---|
| Bearing angle octant: | | | |
| 1 | 90-A | 1 | 90 |
| 2 | A | | |
| 3 | 90-A | 2 | 180 |
| 4 | A | | |
| 5 | 90-A | 3 | 270 |
| 6 | A | | |
| 7 | 90-A | 4 | 360 |
| 8 | A | | |

Further control circuitry, the octant logic unit 15 and the quadrant logic unit 16 are implemented and controlled along with the registers 21 and 22 and the gates 45 to subtract either A or 90 − A from the greatest angle in the particular quadrant wherein the bearing angle lies in order to provide the bearing angle. A logic unit 60 is provided which upon enablement by a signal from the control unit 13 provides the binary number 360 which is entered into the previously cleared dividend register 22. The dividend register 22 is connected to receive a shift signal from the control unit 13 through a normally enabled gate 61 which is connected to cause all of the stages of the register 22 to be shifted to the right by shift signals from the unit 13 and is controlled by the quadrant logic unit 16. Shifting the contents of the dividend register 22 twice to the right will cause the register 22 to contain the binary number 90.

The octant logic 15, when enabled by the control unit 13, provides an inhibit signal to the gates 45 if the bearing angle lies in an even numbered octant. The bearing angle lies in an even octant either when the signs of the component signals are the same and the north-south component signal is not greater than the east-west component signal or when the signs are not the same and the north-south component signal is greater than the east-west component signal as indicated by a ONE signal from the holding unit 12. Thereby, the gates 45 are prevented from filling the register 21 with the difference signal $D_n$ between the number 90 and the related angle A derived by the ring subtracter 30. The octant logic 15 consequently directs whether the quantity representing the angle A remains in the register 21 or is replaced by the binary number 90 − A.

The quadrant logic unit 16, in effect, is implemented to ascertain that quadrant which contains the bearing angle from the indication by the unit 12 as to whether the north-south component signal is the greater and from the divisor and dividend sign signals since it is known which of the signs received from the gates 14 is related to the greater component signal. If the bearing angle lies in the first quadrant, the gate 61 will remain enabled and will not be inhibited by the unit 16 in response to the first of two successive enable signals applied to the unit 16 by the control unit 13 which, in addition, concurrently applies two successive shift signals to the gate 61. If the bearing angle lies in the second quadrant, the logic unit 16 responds to the first of the two enable signals to inhibit the gate 61 so that only one shift signal is applied to the register 22. If the bearing angle lies in either the third or the fourth quadrants, the logic unit 16 responds to both the first and the second enable signals to inhibit the gate 61 so that the register 22 receives no shift signal therethrough.

When the bearing angle lies in the third quadrant, certain stages only of the register 22 are to be shifted by the two successive shift signals which occur concurrently with the two successive enable signals applied to the logic unit 16. The shift signals fed to the gate 61 from the control unit 13 are also fed to a normally inhibited gate 62 which is connected to cause the shifting of stages two, three, six and seven only. In this case, after the logic unit 60 has been enabled to fill the cleared register 22 with the binary number 360, the gate 62 is enabled by the logic unit 16 in response to the two successive enable signals and the contents of the register 22 are changed first to 300 and then to 270 by applying the two successive shift signals through the enabled gate 62 while gate 61 is inhibited by the logic unit 16.

In the above-indicated mode of operation, after the related angle A has been derived by subtracting the appropriate correction number derived by the logic unit 56 from the whole number represented by the series of binary digits indicating the quotient of the divisor and dividend signals and after the related angle A has been placed in the register 21, the octant logic 15 is enabled to cause the quantity 90 − A to be entered into register 21 when the bearing angle lies in an odd numbered octant and allows the quantity A to remain in the register 21 when the bearing angle lies in an even numbered octant. Thereafter, the dividend register 22 is caused by the logic unit 60 and the quadrant logic 16 to contain one of the numbers 90, 180, 270 or 360 when the bearing angle lies respectively in the first, second, third or fourth quadrant. The new contents of the register 21 are then subtracted from the new contents of the register 22 by the ring subtracter 30, and the gates 45 are enabled so that the difference, i.e., the bearing angle, in binary form is contained in the register 21.

The contents of the register 21 may then be directed in parallel through the gates 63 when they are enabled by the control unit 13 to utilization apparatus 64. Such apparatus 64 may include other signal processing apparatus, signal storage apparatus, or a binary to decimal converter and display apparatus.

Figure 5:
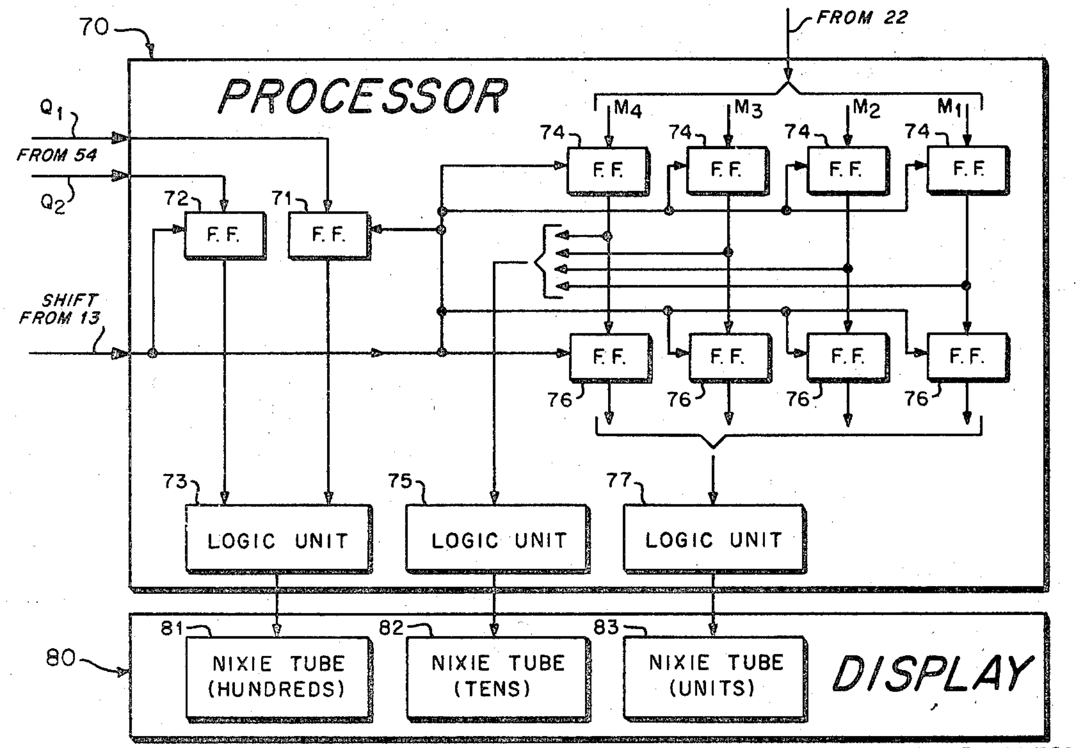
FIG. 5 represents a block of a processor and display included in the computer of FIG. 1.

In applications where the size of the total computer package is at a premium, it has been found convenient to use the above-described computer in combination with a unique processor 70 having a minimum number of components which provides appropriate signals for driving a visual display 80. More particularly, the processor 70, shown in detail in FIG. 5, includes a pair of flip-flops 71 and 72 which are connected to receive the output signals from the lowest order and the next to lowest order stages of the quotient register 54. The output signals of the flip-flops 71 and 72 are fed to a binary to decimal converter logic unit 73 which provides an output signal for driving a nixie tube 81 in the display 80 for displaying the hundreds digit. Additionally, the processor 70 includes four flip-flops 74 which are each connected to receive an output signal from a respective one of the first four stages of the register 22. The output signals of the flip-flops 74 are all fed to a binary to decimal converter logic unit 75 and are each fed to the inputs of a respective one of four other flip-flops 76 whose output signals are fed to a binary to decimal converter logic unit 77. The logic unit 75 provides an output signal to the display 80 for driving a nixie tube 82 for displaying the tens digits while the logic unit 77 provides an output signal to the display 80 for driving a nixie tube 83 for displaying the units digit. The flip-flops 71, 72, 74 and 76 are all connected to receive a shift signal from the control unit 13 at programmed times. The flip-flops 74 and 76 function like four paralleled, two-stage shift registers whose first stage and whose second stage output signals in parallel drive respective logic units 75 and 77.

If a number N is defined by the general equation $Ar^2 + Br + C$, a quotient of $Ar + B$ and a remainder of C may be obtained by dividing the general equation by $r$. Hence, the first division of the number N yields a remainder which is equal to the lowest order digit in the number N. Similarly a quotient and a remainder B may be obtained by dividing the quotient $Ar + B$ by $r$. Therefore, the bearing angle in binary form may be converted into three binary coded decimals for driving the decimal display by dividing the binary bearing angle by 10, by storing the first binary remainder, by dividing the first quotient by 10, and by using the second quotient, the second binary remainder and the first binary remainder for driving the display 80.

To facilitate division of the bearing angle by 10, the computer of FIG. 1 includes a logic unit 91 which, when enabled by the unit 13 after the bearing angle number has been moved to the dividend register 22 from the divisor register 21, applies a ONE to both the seventh and the ninth stages of the cleared register 21. Therefore, the most significant digit of the binary 10 is located in the ninth stage of the divisor register 21 since that is the highest order stage of the register 22 which could contain a digit of ONE because the greatest possible bearing angle is 360. As indicated above, the registers 21, 22 and 54, the ring subtracter 30, the logic unit 50 and associated gates are thereafter controlled so that a six digit quotient signal appears in the quotient register 54 and the remainder appears in the dividend register 22. Only five shifts of the register 21 are made in order to avoid introducing fractional digits which are ZERO into the quotient. Only a six digit quotient is required because 36 is the greatest quotient which could be obtained. When the six digit quotient signal representing a whole number appears in the register 54, the flip-flops in the processor 70 are shifted so that the remainder contained in the four lowest order stages of the register 22 can be stored in the flip-flops 74. The quotient and the remainder are incidentally processed by the logic units 73 and 75 to cause the hundreds digit nixie tube 81 to display the decimal directed by the two lowest order digits of the quotient and to cause the tens digit nixie tube 82 to display the units digit. Thereafter, the gates 55 are enabled so that the six digit quotient stored in the register 54 can be entered into the cleared register 22.

The computer further includes a logic unit 92 which responds to an enable signal from the unit 13 to apply a ONE to both the stages six and four of the register 21. Since the highest order stage of register 22 which could contain a ONE is stage six, 36 being the greatest quotient which could be obtained by the immediately preceding division process, the binary 10 is placed in the divisor register 21 with its most significant digit in stage six. The computer is controlled by the unit 13 so that a two digit quotient appears in the quotient register 54 and the remainder appears in the dividend register 22. Only a two digit quotient is needed since three is the greatest second quotient which could occur. The flip-flops of the processor 70 are all shifted so that the number appearing in the two lowest order stages of the quotient register 54 is applied to the logic 73 which, in turn, drives the nixie tube 81 to display the hundreds digit. Since the flip-flops 74 and 76 are all shifted, the stored units digit is processed by the logic unit 77 to drive the nixie tube 83 to display the appropriate units digit; and the second remainder in the register 22 and appearing as the binary output signal of the flip-flops 74 is processed by the logic unit 75 to drive the nixie tube 82 to display the appropriate tens digit.

A sequence of steps wherein the control unit 13 provides various combinations of enable, shift and clear signals to other portions of the computer to cause the computation of the bearing angle and to cause the processing of the bearing angle for decimal display is shown in tables III and IV.

TABLE III. CONTROL UNIT 13 OUTPUT FOR COMPUTATION OF BEARING ANGLE

[From 13″ to Reference Number of device receiving control signal]

| Step | Enable | Shift | Clear | Result |
|---|---|---|---|---|
| 1 | | | 43, 54, 21, 22 | Apparatus Ready. |
| 2-11 | 19, 20 | 12, 21, 22 | | Divisor in 21; Lesser or Equal Dividend in 22. |
| 12 | 14 | 12, 21, 22 | | |
| 13, 16 . . . 31 | 43 | | | Division; Quotient in 54. |
| 14, 17 . . . 32 | | 54 | | |
| 15, 18 . . . 30 | 23, 44 | 21 | | |
| 33 | | | 21, 22 | Quotient in 22. Correction in 21. |
| 34 | 55, 57 | | | |
| 35 | 45 | | | Related Angle A in 21. |
| 36 | | | 22, 54 | "360" in 22. |
| 37 | 60 | | | |
| 38 | | 22 | | "180" in 22. |
| 39 | | 22 | | "90" in 22. |
| 40 | 15, 45 | | | "A" or "90"—"A" in 21. |
| 41 | | | 22 | "360" in 22. |
| 42 | 60 | | | |
| 43 | 16 | 22 | | "360" or "300" or "180" in 22. |
| 44 | 16 | 22 | | "360" or "270" or "180" or "90" in 22. |
| 45 | 45 | | | Bearing Angle in 21. |
| 46 | 63 | | | Provide Bearing Angle in Parallel Binary Form to 64. |

TABLE IV.—CONTROL UNIT 13 OUTPUT FOR PROCESSING BEARING ANGLE FOR DECIMAL DISPLAY

| Step | Device to receive control signal from 13 | | | Result |
|---|---|---|---|---|
| | Enable | Shift | Clear | |
| 47-57 | 24 | 21, 22 | | Bearing Angle in 22. |
| 58 | | | 21, 43, 54 | "320" in 21. |
| 59 | 91 | | | |
| 60, 63 . . . 75 | 43 | | | Bearing Angle Divided by Ten; Units Digit From 22 Stored in 74 and Displayed by 82. |
| 61, 64 . . . 76 | | 54 | | |
| 62, 65 . . . 77 | 23, 44 | 21 | | |
| 78 | | 70 | | |
| 79 | | | 21, 22, 43 | Quotient in 22. |
| 80 | 55, 92 | | | "40" in 21. |
| 81, 84, 87 | 43 | | 54 | Quotient Divided by Ten; Hundreds Digit in 54 Displayed by 81; Tens Digit in 22 Displayed by 82; Units Digit Displayed by 83. |
| 82, 85, 88 | | 54 | | |
| 83, 86, 89 | 23, 44 | 21 | | |
| 90 | | 70 | | |

While the control unit 13 may be mechanized to provide other sequences of steps than that shown above in tables III and IV, the general outline of the process of computing and displaying the bearing angle include the broad steps of dividing the lesser component signal by the greater, considering the fractional quotient obtained as representing a whole number and correcting that number by subtraction to obtain an angle A whose tangent is substantially equal to the fractional quotient, processing the angle A to obtain in binary form a bearing angle referenced to north, and converting the bearing angle into three binary coded decimals for driving a display. If it is desired that the computer provide a serial binary output signal representing the bearing angle, the gate 24 is enabled; and the computed bearing angle is shifted out of the divisor register 22 and directed to the desired apparatus.

There are certain similarities between certain groups of steps in the tables III and IV. For example, each table includes a series of steps wherein information is entered into the divisor and dividend registers 21 and 22, i.e., steps 2—12 and 47—59. After the registers 21 and 22 have been filled, in each table an identical series of steps occurs wherein the contents of the dividend register 22 are divided by the contents of the divisor register 21, e.g., steps 13—29 and 60—76. The preferred sequence of steps makes possible the use of a less complex control unit 13 which may be conveniently constructed from a Johnson counter which includes a four-stage shift register and a seven-stage shift register and which is cycled twice to complete the 90 steps indicated. Of course the unit 13 would include the necessary logic to divert to the respective appropriate components the enable, the shift and the clear signals required for each step.

The above-described computer is well adapted for processing component signals to compute and display a bearing angle and includes a relatively small number of components of minimal complexity. Further, the computer includes a unique divider which is capable of dividing one binary signal by another binary signal even though the signals are supplied in serial form with the least significant digit first. The computer has been further simplified in that the same components which are utilized in computing the bearing angle are further utilized in converting the bearing angle into three binary coded decimals.

It should be understood, of course, that the foregoing disclosure relates only to a preferred embodiment of the invention and that numerous modifications or alterations may be made without departing from the spirit and scope of the invention as set forth in the appended claims.

I claim:

1. Digital divider apparatus comprising:

first and second shift register means each having plurality of stages for receiving respectively a divisor signal and a dividend signal and for providing parallel binary output signals, said first and second registers adapted to receive first and second timing signals respectively and to shift to the right in response thereto;

first gating means connected to said first register and receiving a third timing signal for passing and applying the output signal of a first said stage of said first register means to a last said stage of said first register means in response to said third timing signal;

ring subtracter means having a plurality of stages each for producing a borrow signal applied to the next succeeding stage and for producing a difference signal, said ring subtracter means being connected to receive said output signals from said first and second register means and adapted to receive a fourth timing signal for providing a parallel binary signal indicative of a difference between said dividend and said divisor signals and for providing a most significant borrow signal produced in a most significant stage;

a least significant stage of said ring subtracter means receiving said borrow signal from said most significant stage and being progressively shifted to the right in response to said fourth timing signal; and quotient means connected to said ring subtracter means and responsive to said most significant borrow signal for producing a binary quotient signal indicative of the quotient of said dividend and said divisor signals.

2. Apparatus according to claim 1 wherein said ring subtracter means further includes: circuit means connected to a first and a last stage of said subtracter means for applying said borrow signal produced by said last stage of said subtracter means to said first stage of said subtracter means.

3. Apparatus according to claim 2 wherein said quotient means comprises:

quotient digit means connected to said subtracter means and responsive to said parallel borrow signal and adapted to receive a fifth timing signal for providing quotient digits in response to a predetermined coincidence of said fifth timing signal and said parallel borrow signal; and left shifting register means connected to said quotient digit means for storing said quotient digits and providing said quotient signal.

4. Apparatus according to claim 3 further comprising: second gating means connected between said ring subtracter means and said second register means for receiving said parallel difference signal and connected to said left shifting register means and responsive to a least significant quotient digit stored in said left shifting register means for entering said parallel difference signal into said second register means.

5. Apparatus according to claim 4 wherein:

a number of succeeding stages of said subtracter means includes third gating means coupled to receive a blocking signal for causing a corresponding stage to be said least significant stage and to produce such respective borrow and difference signals as if said borrow signal applied to said corresponding stage were a ZERO, said blocking signal being applied to said third gating means of one of said number of succeeding stages and successively thereafter to said third gating means of the next preceding stage to the right.

6. A bearing angle computer for processing a pair of component signals each having an intensity indicating portion and a direction indicating portion to obtain a bearing angle comprising:

a divider including a divisor register, a dividend register, a quotient register and subtractor means connected to said divisor and dividend registers and responsive to the contents of said divisor and dividend registers for producing in said quotient register a quotient signal simultaneously representing both a whole number and a proper fraction equal to the quotient of a dividend and a divisor;

signal routing means coupled to receive said pair of component signals for comparing said intensity portions of said component signals and for passing the intensity portion of a greater of said component signals to said divisor register and the intensity portion of a lesser of said component signals to said dividend register; and first logic means operatively connected to said quotient register and said divisor register for receiving said quotient signal and responsive thereto for applying to said divisor register a predetermined correction number signal having a value equal to the difference between said whole number represented by said quotient signal and the whole number representing an angle having a tangent substantially equal to said proper fraction represented by said quotient signal.

7. A computer according to claim 6 wherein:

said divisor and dividend registers comprise right-shifting registers each having a plurality of stages for providing parallel binary output signals;

said quotient register comprises a left-shifting register having a plurality of stages connected to said subtracter means;

said subtracter means comprises a ring subtracter means having a plurality of stages each for producing a borrow signal applied to the next succeeding stage and for producing a difference signal, said ring subtracter means being connected to receive said output signals from said divisor and dividend registers and adapted to receive a first timing signal for providing a parallel binary signal indicative of the difference between the contents of said divisor and dividend registers and for providing a most significant borrow signal produced in a most significant stage, a least significant stage of said ring subtracter means receiving said borrow signal from said most significant stage and being progressively shifted to the right in response to said first timing signal; and said computer further comprises:

gating means connected to said first register and adapted to receive a second timing signal for passing and applying the output signal of a first said stage of said divisor register to a last said stage of said divisor register in response to said second timing signal; and quotient digit means connected to said ring subtracter means and to said quotient register and responsive to said parallel borrow signal and adapted to receive a third timing signal for providing quotient digits to said quotient register in response to a predetermined coincidence of said third timing signal and said parallel borrow signal.

8. A computer according to claim 6 further comprising:

first gating means connected between said first logic means and said divisor register for entering said correction number signal into said divisor register;

second gating means connected between said quotient and said dividend registers for entering said quotient signal into said dividend register;

said subtracter means further providing a difference signal representing a related angle and indicative of the difference between said whole number represented by said quotient signal in said dividend register and said correction number signal in said divisor register; and control means connected to said quotient register and to said first and second gating means for causing said quotient register first to provide said quotient signal and thereafter for actuating said first and second gating means.

9. A computer according to claim 8 further comprising:

third gating means connected between said subtracter means and said divisor register for entering said related angle difference signal into said divisor register;

means for entering the whole number ninety into said dividend register; second logic means connected to said signal routing means and responsive to the direction portions of the component signals and the intensity portions of said component signals for inhibiting said third gating means when the bearing angle is contained within an even numbered octant;

third logic means connected to said signal routing means and responsive to the direction portions of the component signal and the intensity portions of said component signals for entering into said dividend register a quadrant signal indicative of the quadrant containing the bearing angle; and said control means being adapted for sequentially causing said divider to provide said quotient signal actuating said first and second gating means, actuating said third gating means, actuating said means entering ninety into said dividend register, actuating both said second logic means and said third gating means, and actuating said third logic means to enter said quadrant signal and for causing said subtracter to provide a difference signal indicative of the bearing angle.

10. A computer according to claim 9 further comprising:

means connected to receive said bearing angle difference signal for entering said received signal into said dividend register; means for entering the whole number 320 into said divisor register;

said divider further providing a remainder signal;

fourth gating means connected between said subtracter means and said dividend register for entering said remainder signal into said dividend register;

means for entering the whole number 40 into said divisor register;